United States Patent
Renard

(10) Patent No.: US 12,326,021 B2
(45) Date of Patent: Jun. 10, 2025

(54) HOOK LATCH FOR AIRCRAFT PANEL

(71) Applicant: LISI AEROSPACE, Paris (FR)

(72) Inventor: Laurent Renard, Saint-Ouen-l'Aumône (FR)

(73) Assignee: LISI AEROSPACE, Paris (FR)

( * ) Notice: Subject to any disclaimer, the term of this patent is extended or adjusted under 35 U.S.C. 154(b) by 108 days.

(21) Appl. No.: 18/243,668

(22) Filed: Sep. 8, 2023

(65) Prior Publication Data

US 2024/0125157 A1     Apr. 18, 2024

(30) Foreign Application Priority Data

Oct. 14, 2022 (FR) ........................................ 2210592

(51) Int. Cl.
   *E05C 5/02*         (2006.01)
   *B64D 29/06*      (2006.01)

(52) U.S. Cl.
   CPC ................ *E05C 5/02* (2013.01); *B64D 29/06* (2013.01)

(58) Field of Classification Search
   CPC ............ Y10S 292/49; Y10T 292/0911; Y10T 292/0959; Y10T 292/0917; Y10T 292/0926; Y10T 292/1043; Y10T 292/1075; Y10T 292/216; E05C 19/14; E05C 19/145; E05B 15/0086; E05B 65/0817
See application file for complete search history.

(56) References Cited

U.S. PATENT DOCUMENTS

| | | | |
|---|---|---|---|
| 4,549,708 A | 10/1985 | Norris | |
| 9,617,767 B1* | 4/2017 | Baic | E05C 19/145 |
| 2006/0061108 A1* | 3/2006 | Meineke | B64D 29/06 |
| | | | 292/110 |
| 2017/0089107 A1* | 3/2017 | Do | E05C 19/145 |
| 2017/0101811 A1* | 4/2017 | Parsell, Jr. | E05C 19/145 |
| 2017/0260782 A1* | 9/2017 | Kim | E05B 13/002 |

(Continued)

FOREIGN PATENT DOCUMENTS

| | | |
|---|---|---|
| EP | 3215696 | 12/2018 |
| FR | 2261396 | 9/1975 |

(Continued)

OTHER PUBLICATIONS

Morasch, Alexander, Preliminary Search Report, Apr. 6, 2023, 2 pages, National Institute of Industrial Property, Courbevoie, France.

*Primary Examiner* — Christine M Mills
*Assistant Examiner* — Yahya Sidky
(74) *Attorney, Agent, or Firm* — Henricks Slavin LLP

(57) ABSTRACT

A latch (12) is for connecting a panel to a structure, comprising: a bracket (30); a sliding body (32), translationally movable within the bracket; and a hooking arm (34) comprising a hook (74) and connected to the sliding body. The hooking arm is movable relative to the sliding body between an inclined and a parallel conformation. The sliding body can be moved between an unlocking position and a locking position. In the unlocking position, the hooking arm (34) is in an inclined conformation and in a first axial position relative to the bracket. In the locking position, the hooking arm is in the parallel conformation and in a second axial position. In an intermediate position, the hooking arm is in the parallel conformation and in the first axial position.

7 Claims, 4 Drawing Sheets

(56) References Cited

U.S. PATENT DOCUMENTS

| | | | |
|---|---|---|---|
| 2020/0300011 A1* | 9/2020 | Micallef | E05C 19/145 |
| 2022/0195765 A1* | 6/2022 | McMahan | E05B 63/06 |
| 2023/0250682 A1* | 8/2023 | Newell | E05C 19/145 |
| | | | 292/259 A |
| 2024/0043128 A1* | 2/2024 | Shivarudrappa | B64D 29/06 |

FOREIGN PATENT DOCUMENTS

| | | |
|---|---|---|
| SU | 925015 | 10/1986 |
| WO | WO2016071202 | 5/2016 |

* cited by examiner

HOOK LATCH FOR AIRCRAFT PANEL

BACKGROUND

The present invention relates to a latch intended to assemble a panel to a structure, of the type comprising: a bracket capable of being attached to the panel, said bracket comprising a through-housing, extending along a first axis between a first and a second end; a sliding body, translationally movable along the first axis within the housing of the bracket and extending between a first and a second end; and a hooking arm extending along a second axis between a first and a second end, said first end comprising a hook, said second end being connected to the first end of the sliding body; the hooking arm projecting from the first end of the housing; the hook of the hooking arm being able to cooperate with a keeper fixed to the structure; the hooking arm being movable relative to the sliding body between a first and a second conformation, such that in the first conformation, the second axis is inclined at a first non-zero angle to the first axis; and in the second conformation, the second axis is parallel to the first axis.

The invention is particularly applicable to aircraft nacelle cowl latches. Such a latch is known in particular from U.S. Pat. No. 4,549,708.

Latches are generally positioned under the nacelle. Such a position makes it difficult to access said latches.

SUMMARY

The purpose of the present invention is to provide a latch that is suitable for nacelle cowlings and which offers easier access than known solutions.

To this end, the object of the invention is a latch of the aforementioned type, wherein the sliding body is movable within the housing along the first axis between an unlocking position and a locking position; the latch being configured so that: in the unlocking position of the sliding body, the hooking arm is in the first conformation, said hooking arm being in a first axial position relative to the bracket; in the locking position of the sliding body, the hooking arm is in the second conformation, said hooking arm being in a second axial position relative to the bracket, closer to the second end of the housing than in the first position; and in an intermediate position, between the locking and unlocking positions, the hooking arm is in the second conformation and in the first axial position relative to the bracket.

Among other advantageous aspects of the invention, the latch comprises one or more of the following features, taken individually or in accordance with all technically possible combinations:

- the latch is configured so that, in the second conformation of the hooking arm, the second end of said hooking arm is further away from the second end of the sliding body than in the first conformation of said hooking arm;
- the latch further comprises: a yoke, locked in translation in relation to the hooking arm and translationally movable along the first axis in relation to the sliding body; and a compression spring, arranged along the first axis between the yoke and the sliding body; the first and second conformations of the hooking arm corresponding respectively to a compressed configuration and a deployed configuration of the compression spring;
- the yoke comprises a stop oriented towards the first end of the hooking arm; and the bracket housing comprises a counter-stop, able to cooperate with the stop along the first axis; the latch being configured in that: in the unlocking position and in the intermediate position of the sliding body, the stop is in contact with the counter-stop; and in the locking position, the stop is arranged at a distance from the counter-stop;
- the second end of the hooking arm comprises first and second through-holes, perpendicular to the second axis; the first end of the sliding body comprises: a first slot parallel to the first axis; and a second slot inclined at a non-zero angle in relation to the first axis; each of the first and second slots comprising first and second closed ends;
- the latch further comprises a first and a second pin inserted respectively into the first and second through-holes of the hooking arm; the first pin being able to slide into the first slot, the second pin being able to slide into the second slot; the latch being configured so that: in the first conformation of the hooking arm, each of the first and second pins is arranged at the first end of the first and second slots respectively; and in the second conformation of the hooking arm, each of the first and second pins is arranged at the second end of the first and second slots respectively;
- the sliding body comprises a through-hole, and the bracket comprises a rod engaged in the through-hole, the rod being able to slide in the through-hole along the first axis, when the latch is moved between the locking position and the unlocking position.

The invention also relates to an aircraft comprising: a structure; a panel movable relative to said structure; and a latch as described above, said latch being attached to the panel such that in the locking position of the sliding body relative to the bracket, said latch prevents the opening of the panel relative to the structure.

BRIEF DESCRIPTION OF THE DRAWINGS

The invention will be better understood upon reading the following description, which is presented only as a non-limiting example, and with reference to the drawings, in which.

DESCRIPTION

Figure 4:
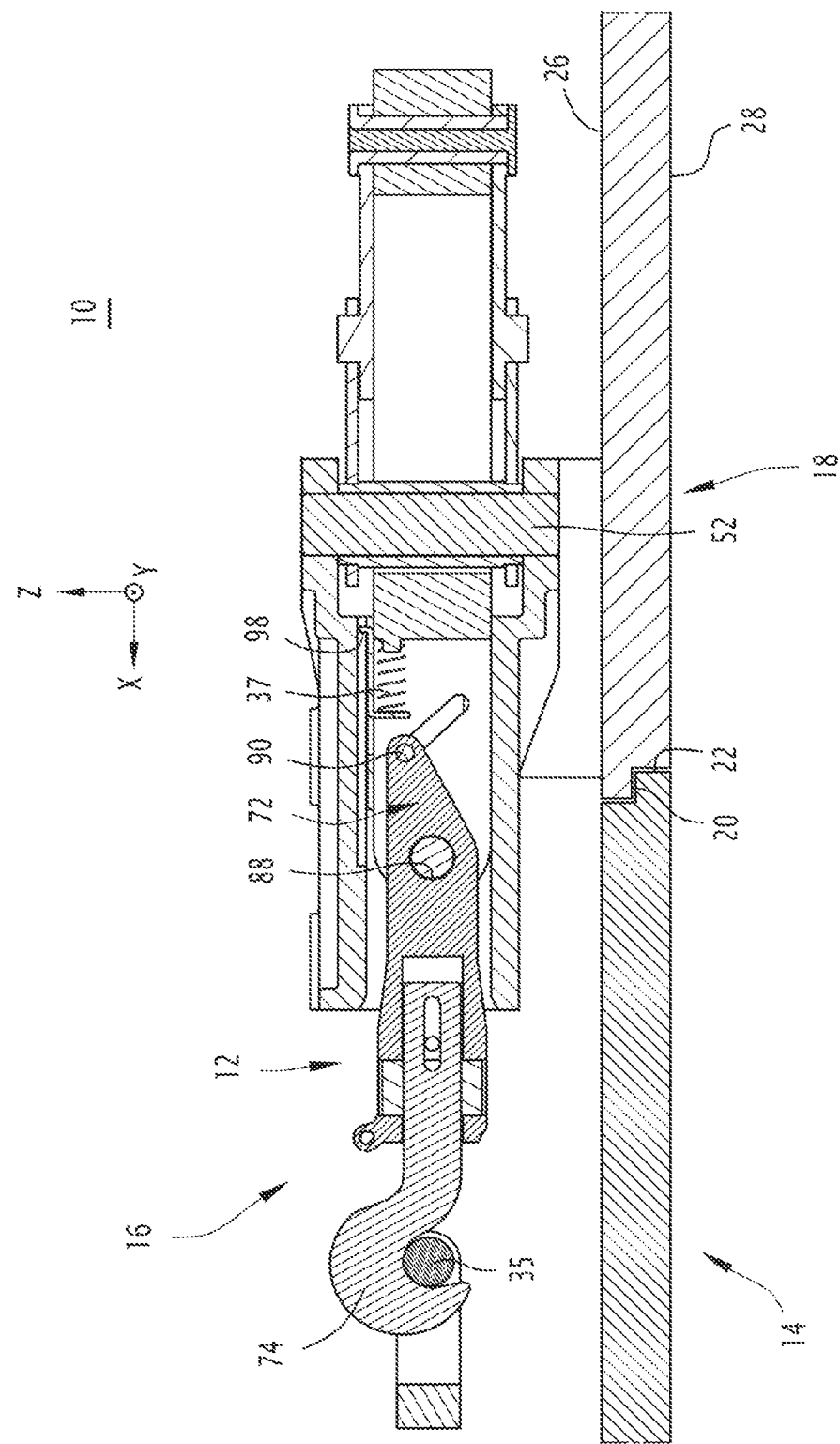
FIG. 4 is a cross-sectional view of an aircraft comprising the latch of FIGS. 1 to 3, said latch being in a third configuration.

FIG. 4 illustrates an aircraft 10 comprising a latch 12 according to an embodiment of the invention. More specifically, the aircraft 10 also includes: a structure 14, in which a compartment 16 is fitted; and a panel 18, hinged to the structure 14 and capable of opening and closing the compartment 16. In a closed configuration of said compartment 16, visible in FIG. 4, an edge 20 of the panel 18 is in contact with an edge 22 of structure 14.

As specified hereafter, the latch 12 is assembled to the panel 18. In the description, an orthonormal basis (X, Y, Z) associated with the panel 18 and the latch 12 is considered, the Z direction representing the normal to the X-Y plane.

As represented here the panel 18 comprises an upper face 26 and a lower face 28, each of said faces lying substantially in a plane (X, Y). In the closed configuration of the panel 18, shown in FIG. 4, the upper face 26 is oriented towards the compartment 16.

Figure 1:
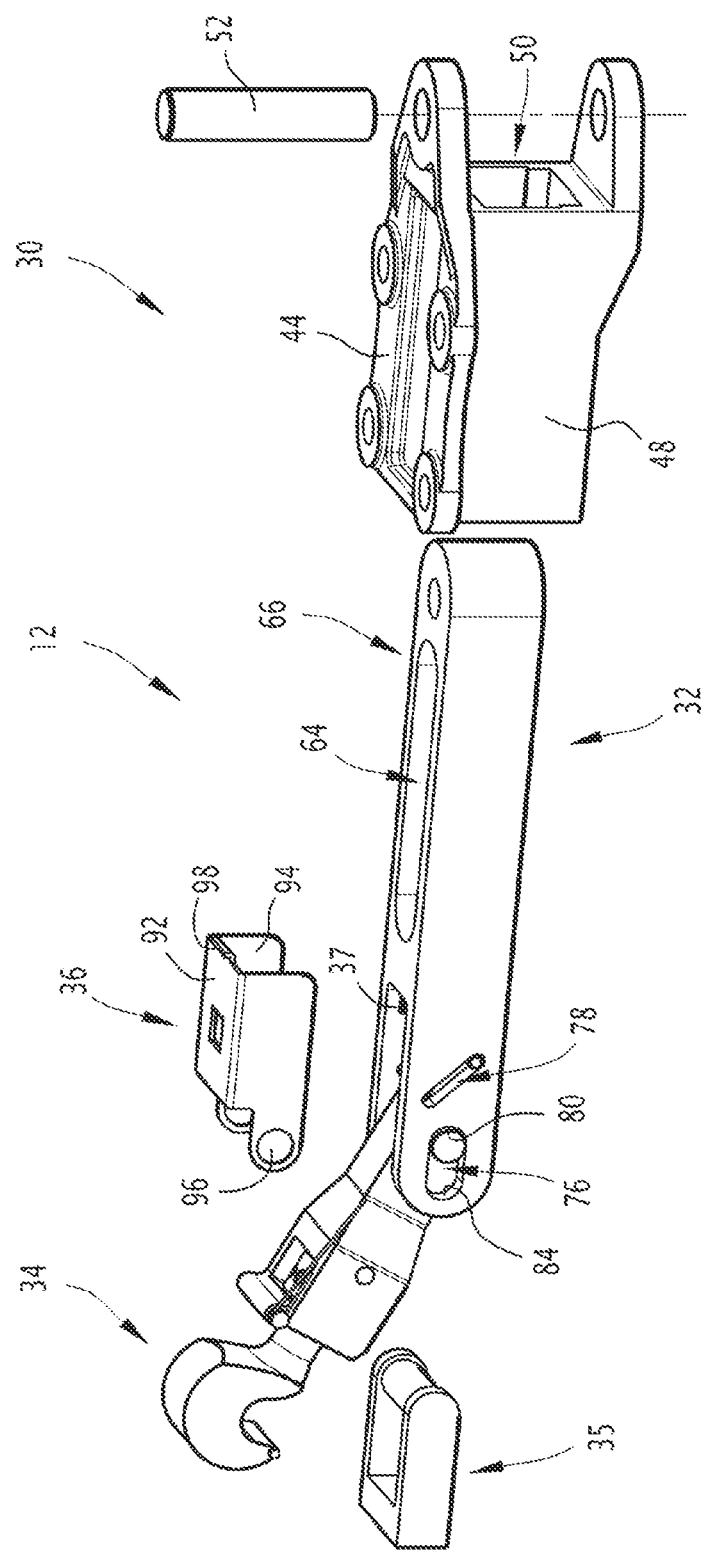
FIG. 1 is a partially exploded, perspective view of a latch according to a first embodiment of the invention, in a first configuration.
Figure 2:
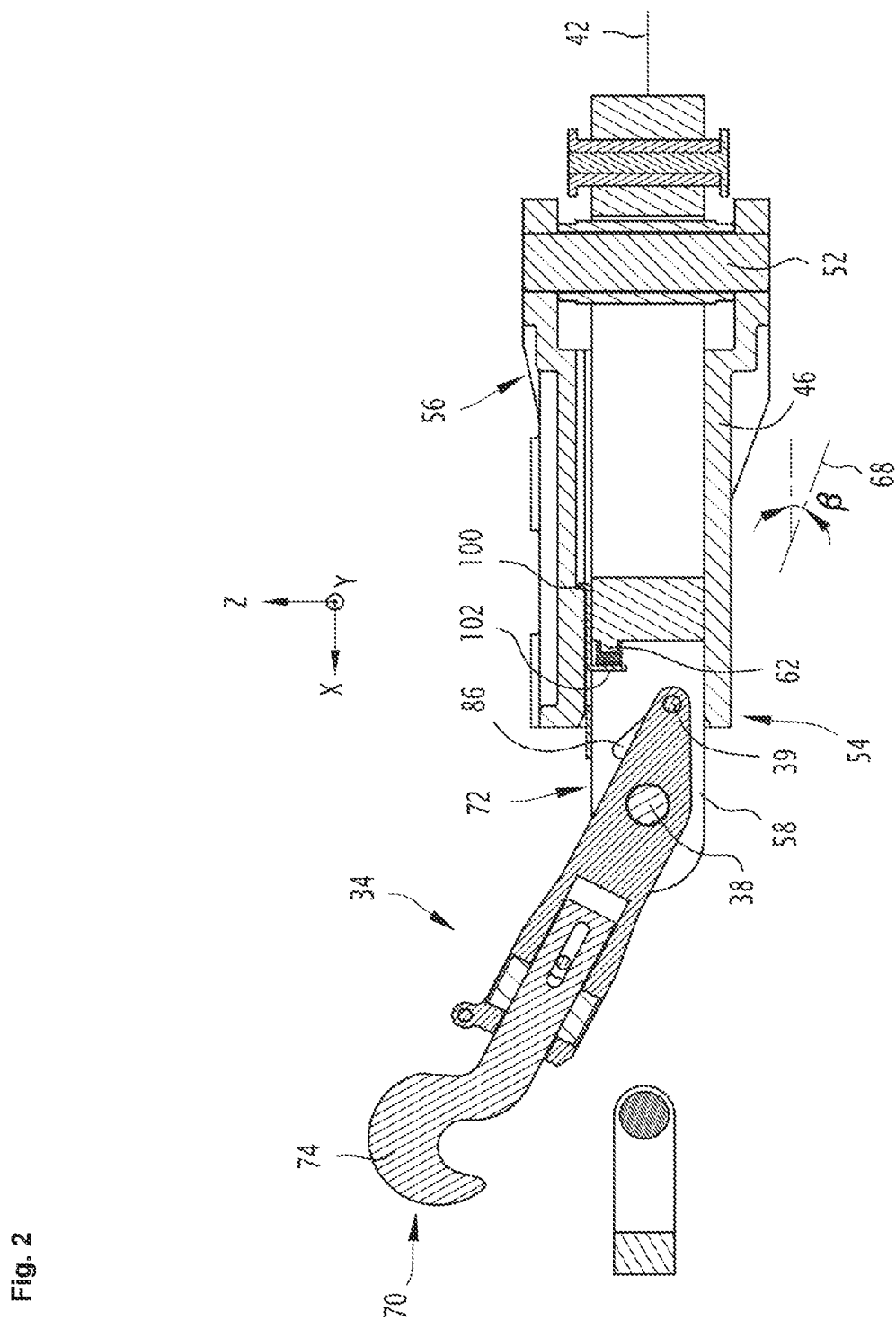
FIGS. 2 and 3 are cross-sectional views of the latch shown in FIG. 1, in the first and second configurations respectively.
Figure 3:
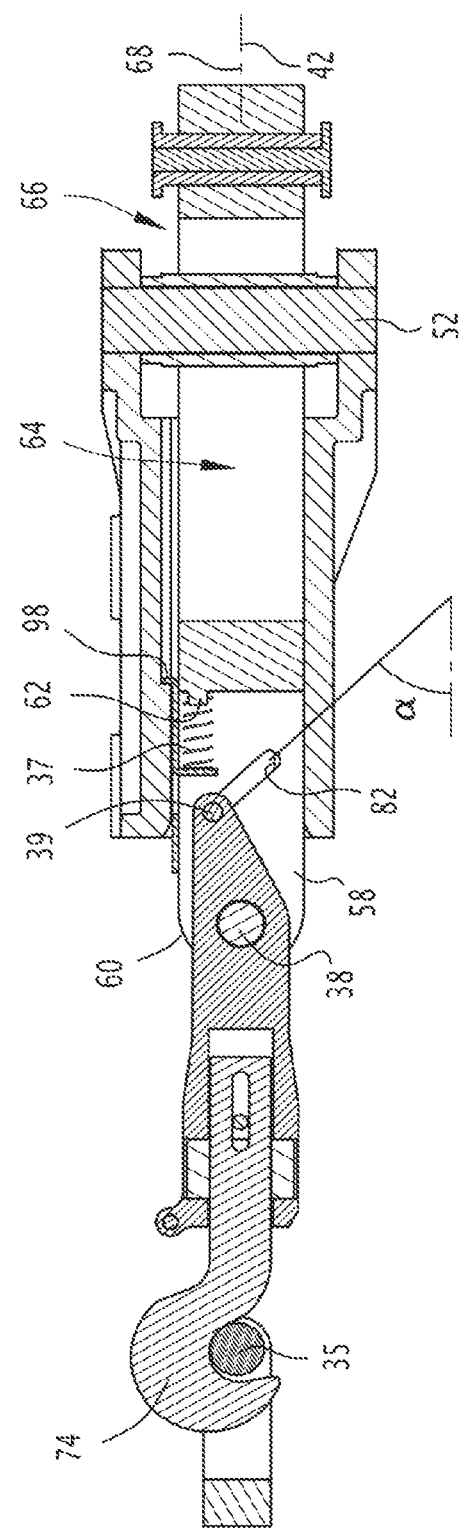

The latch 12, also visible in FIGS. 1, 2 and 3, comprises: a bracket 30; a sliding body 32 and a hooking arm 34 able to engage with a keeper 35. In the embodiment shown, the latch 12 further comprises: a yoke 36; a compression spring 37; and first 38 and second 39 pins.

Preferably, the latch 12 also comprises an actuating member (not shown).

The bracket 30 extends along a first axis 42 parallel to X and comprises a top plate 44 and a bottom plate 46. These plates are substantially flat and parallel to each other.

The lower plate 46 is attached to the upper face 26 of the panel 18.

On a first portion along X of the bracket 30, side walls 48 connect the upper 44 and lower 46 plates, forming a through-housing 50. The housing 50 extends along the first axis 42. On a second section along X of the bracket 30, the upper 44 and lower 46 plates are connected by a rod 52 parallel to Z.

A first end 54 of housing 50 forms one end of the bracket 30 along X. A second end 56 of said housing opens onto the rod 52.

The sliding body 32 is translationally movable along the first axis 42 within the housing 50 of the bracket 30.

A first portion along X of the sliding body 32 comprises two parallel lugs 58. Each lug 58 is substantially flat and extends in a plane (X, Z). The lugs 58 are spaced apart along Y and symmetrical to each other with respect to a plane (X, Z) passing through the first axis 42. A free end 60 of the lugs 58 along X forms a first end of the sliding body 32. The lugs 58 are described in more detail below.

Between the lugs 58, the first portion of the sliding body 32 also features a pin 62 arranged along the first axis 42.

A second portion along X of the sliding body 32 comprises an opening 64. Said opening 64 is a through-hole along Z and extends along X between two closed ends. The rod 52 of the bracket 30 is engaged into the opening 64. One end along X of the opening 64, opposite the lugs 58, is arranged at a second end 66 of the sliding body 32.

The hooking arm 34 extends along the main axis 68, between a first end 70 and second end 72. The second axis 68 is coplanar with the first axis 42 along an (X, Z) plane.

The first end 70 of the hooking arm 34 comprises a hook 74.

The second end 72 of the hooking arm 34 is arranged between the lugs 58 of the sliding body 32. The hooking arm 34, in particular the hook 74, projects along X from the first end 54 of the bracket housing 50.

The hooking arm 34 is connected to the sliding body 32 as described below:

Each lug 58 of the sliding body 32 comprises a first 76 and a second 78 straight slot. The first slot 76 is parallel to the first axis 42. The second slot 78 is inclined at a first non-zero angle α relative to the first axis. The first angle α is preferentially between 20° and 60°.

The first 76 and second 78 slots are spaced apart along X, with the first slot 76 being closest to the first end 60 of the sliding body. Each slot extends between a first 80, 82 and a second 84, 86 closed end.

The second end 72 of the hooking arm 34 comprises a first through-hole 88 and a second through-hole 90, perpendicular to the second axis 68.

Each of the first 38 and second 39 pins is inserted into one of the first 88 and second 90 through-holes. Each end of the first pin 38 is able to slide into the first slot 76 of one of the lugs 58 of the sliding body 32, between the first end 80 and second end 84 of said first slot. Each end of the second pin 39 is able to slide into the second slot 78 of one of the lugs 58 of the sliding body 32, between the first end 82 and second end 86 of said second slot.

The keeper 35 is fixed to the structure 14 and arranged in the compartment 16. The keeper 35 is able to cooperate with the hook 74 of the hooking arm 34. More precisely, in the closed configuration of panel 18, visible in FIG. 4, hook 74 grips keeper 35 so as to hold the panel in the closed configuration. The keeper 35 then extends along Y, perpendicular to the first axis 42.

Yoke 36 comprises a top plate 92 and two side plates 94 connected by said top plate. Each side plate 94 extends substantially in a plane (X, Z), the side plates being arranged on either side of the first portion of the sliding body 32, formed by the lugs 58.

Each of the side plates 94 comprises a hole 96. Each end of the first pin 38 is inserted into the hole 96 of one of said side plates. In this way, yoke 36 is translationally locked with respect to the hooking arm 34 and translationally movable along first axis 42 with respect to sliding body 32.

The upper plate 92 of the yoke 36 has a stop 98 projecting along Z with respect to said plate. The stop 98 is oriented along the first axis 42, towards the first end 70 of the hooking arm. The stop 98 is designed to cooperate with a counter-stop 100 arranged inside the housing 50 of the bracket 30, close to the first end 54 of said housing.

The yoke 36 also features a tongue 102 projecting in the Z direction with respect to the top plate 92, in the opposite direction to the stop 98.

The compression spring 37 is a helical spring, arranged along the first axis 42 between the lug 62 of the sliding body 32 and the tongue 102 of the yoke 36.

A first configuration of the latch 12 is shown in FIGS. 1 and 2.

In said first configuration of latch 12, hooking arm 34 is in a first conformation relative to sliding body 32.

In the first conformation of the hooking arm 34, the second axis 68 is inclined at a second, non-zero angle β relative to the first axis 42. The second angle β is chosen to allow disengagement of hook 74 from keeper 35. For example, the second angle β is less than or equal to 30°.

In the first conformation of the hooking arm 34, the first pin 38 is arranged at the first end 80 of the first slot 76 of each lug 58 of the sliding body 32; and the second pin 39 is arranged at the first end 82 of the second slot 78 of each lug 58.

Furthermore, in the first conformation of the hooking arm 34, the tongue 102 of the yoke 36 is close along X to the lug 62 of the sliding body 32, so that the compression spring 37 is in a compressed configuration.

Furthermore, in the first configuration of the latch 12, the sliding body 32 is arranged in a first position along the first axis 42 relative to the bracket 30. In the said first position, known as the release position, the stop 98 of the yoke 36 is in contact with the counter-stop 100 of the housing 50; and the rod 52 of the bracket 30 is close to the second end 66 of the sliding body 32.

A second configuration of latch 12 is shown in FIG. 3.

In said second configuration of latch 12, hooking arm 34 is in a second conformation relative to the sliding body 32.

In the second conformation of hooking arm 34, second axis 68 is parallel to first axis 42. In the embodiment shown, the first and second axes merge in the second conformation of hooking arm 34.

In the second conformation of the hooking arm 34, the first pin 38 is arranged at the second end 84 of the first slot 76 of each lug 58 of the sliding body 32; and the second pin 39 is arranged at the second end 86 of the second slot 78 of each lug 58.

Furthermore, in the second conformation of the hooking arm 34, the tongue 102 of the yoke 36 is at a distance along X from the lug 62 of the sliding body 32, compared with the first conformation of the hooking arm. Compression spring 37 is thus in an extended configuration.

Furthermore, in the second configuration of latch 12, the first end 70 of the hooking arm is arranged close to keeper 35; and hook 74 is spaced a non-zero distance from said keeper.

Furthermore, in the second configuration of the latch 12, the sliding body 32 is arranged in a second position along the first axis 42 with respect to the bracket 30. In said second position, known as the intermediate position, the stop 98 of the yoke 36 is in contact with the counter-stop 100 of the housing 50; and the rod 52 of the bracket 30 is closer to the first end 60 of the sliding body 32 than in the unlocking position of said sliding body.

A third configuration of latch 12 is shown in FIG. 4.

In said third configuration of latch 12, hooking arm 34 is in the second conformation, previously described, relative to the sliding body 32; and hook 74 is engaged on keeper 35.

Furthermore, in the third configuration of the latch 12, the sliding body 32 is arranged in a third position along the first axis 42 with respect to the bracket 30. In the said third position, known as the locking position, the stop 98 of the yoke 36 is distanced along X from the counter-stop 100 of the housing 50; and the rod 52 of the bracket 30 is closer to the first end 60 of the sliding body 32 than in the intermediate position of the said sliding body.

The actuating member (not shown) of latch 12 is configured to move sliding body 32 relative to bracket 30, between the unlocking and locking positions described above.

In one embodiment, the actuating member comprises a link rod connecting the second end 66 of the sliding body 32 to the panel 18. This link rod can be operated manually.

Alternatively, the actuating member comprises a hydraulic cylinder or an electric motor.

An operating procedure for the latch 12 described above will now be described.

The latch is assumed to be in the first configuration shown in FIGS. 1 and 2. The latch actuating member is then activated so as to move the sliding body 32 in translation relative to the bracket 30, along the first axis 42, from the unlocking position to the intermediate position.

During said movement, the compression spring 37 relaxes, holding the yoke stop 98 in contact with the counter-stop 100 of the housing 50. The hooking arm 34 therefore remains fixed in translation relative to the bracket 30.

Furthermore, as a result of the movement of the sliding body 32, each of the pins 38 and 39 moves from the first end 80, 82 to the second end 84, 86 of the corresponding slot 76, 78.

As a result of the inclination of the second slot 78, the hooking arm 34 rotates counter-clockwise with respect to the bracket 30, about an axis of rotation represented by the first pin 38. The hooking arm thus changes from the first to the second conformation described above. The first 42 and second 68 axes are thus merged.

The actuating member then continues to move the sliding body 32 from the intermediate position to the locking position described above. With the yoke 36 locked in position relative to the hooking arm 34 by means of the first pin 38, the stop 98 moves away from the counter-stop 100 and the hooking arm 34 moves along the first axis 42 relative to the bracket 30. The hook 74 thus moves closer to the keeper 35, until it comes into contact with said keeper along X. Latch 12 is thus in the third configuration shown in FIG. 4, which keeps panel 18 closed.

The invention claimed is:

1. A latch for assembling a panel to a structure, said latch comprising:
  a bracket, suitable for attachment to the panel, that includes a through-housing that extends along a first axis between first and second through-housing ends;
  a sliding body, defining first and second sliding body ends, that is movable along the first axis inside the through-housing such that the first and second sliding body ends both move linearly relative to the through-housing; and
  a hooking arm that extends along a second axis between a first hooking arm end that includes a hook and a second hooking arm end that is connected to the sliding body first end;
  wherein
  the hooking arm projects from the through-housing first end;
  the hook of the hooking arm is configured to cooperate with a keeper fixed to the structure;
  the hooking arm is movable relative to the sliding body between a first conformation where the second axis is inclined by a non-zero first angle (β) relative to the first axis and a second conformation where the second axis is parallel to the first axis;
  the sliding body is linearly movable within the through-housing along the first axis between an unlocking position and a locking position;
  in the unlocking position of the sliding body, the hooking arm is in the first conformation and said hooking arm is in a first axial position relative to the bracket;
  in the locking position of the sliding body, the hooking arm is in the second conformation and said hooking arm is in a second axial position relative to the bracket that is closer to the second end of the through-housing than when in the first axial position; and
  in an intermediate position, between the locking and unlocking positions, the hooking arm is in the second conformation and is in the first axial position relative to the bracket.

2. The latch according to claim 1, wherein the second end of said hooking arm is spaced further away from the second end of the sliding body in the second conformation of said hooking arm than in the first conformation of said hooking arm.

3. The latch according to claim 1, wherein:
  the second end of the hooking arm comprises first and second through-holes that are perpendicular to the second axis;
  the first end of the sliding body comprises a first slot elongated parallel to the first axis and a second slot inclined at a non-zero angle (α) relative to the first axis and each of the first and second slots has first and second closed ends;
  the latch further comprises first and second pins inserted respectively into the first and second through-holes of the hooking arm, the first pin is configured to slide within the first slot, and the second pin is configured to slide within the second slot;

in the first conformation of the hooking arm, each of the first and second pins is arranged at the first end of the first and second slots respectively; and in the second conformation of the hooking arm, each of the first and second pins is arranged at the second end of the first and second slots respectively.

4. An aircraft comprising:

a structure;

a panel movable relative to said structure; and a latch according to claim 1, said latch being attached to the panel such that in the locking position of the sliding body relative to the bracket, said latch prevents the opening of the panel relative to the structure.

5. A latch for assembling a panel to a structure, said latch comprising:

a bracket suitable for attachment to the panel, said bracket comprising a through-housing extending along a first axis between first and second ends;

a sliding body, translationally movable along the first axis inside the through-housing and extending between a first and a second end;

a hooking arm extending along a second axis between a first and a second end, said first end comprising a hook, said second end being connected to the first end of the sliding body; the hooking arm projecting from the first end of the housing;

a yoke locked in translation with respect to the hooking arm and linearly movable along the first axis relative to the sliding body; and a compression spring arranged along the first axis between the yoke and the sliding body;

wherein the hook of the hooking arm is able to cooperate with a keeper fixed to the structure;

the hooking arm is movable relative to the sliding body between a first and a second conformation, such that in the first conformation, the second axis is inclined by a non-zero first angle (β) relative to the first axis, and in the second conformation, the second axis is parallel to the first axis;

the sliding body is movable within the housing along the first axis between an unlocking position and a locking position;

in the unlocking position of the sliding body, the hooking arm is in the first conformation, said hooking arm being in a first axial position relative to the bracket;

in the locking position of the sliding body, the hooking arm is in the second conformation, said hooking arm being in a second axial position relative to the bracket, closer to the second end of the housing than in the first position;

in an intermediate position, between the locking and unlocking positions, the hooking arm is in the second conformation and in the first axial position relative to the bracket; and the first and second conformations of the hooking arm correspond to a compressed configuration and an extended configuration of the compression spring, respectively.

6. The latch according to claim 5, wherein the yoke comprises a stop oriented towards the first end of the hooking arm;

the bracket housing comprises a counter-stop that is configured to cooperate with the stop along the first axis; and the latch is configured such that in the unlocking position and in the intermediate position of the sliding body, the stop is in contact with the counter-stop and in the locking position, the stop is arranged at a distance from the counter-stop.

7. A latch for assembling a panel to a structure, said latch comprising:

a bracket suitable for attachment to the panel, said bracket comprising a through-housing extending along a first axis between first and second ends;

a sliding body, translationally movable along the first axis inside the through-housing and extending between a first and a second end;

a hooking arm extending along a second axis between a first and a second end, said first end comprising a hook, said second end being connected to the first end of the sliding body; the hooking arm projecting from the first end of the housing;

wherein the hook of the hooking arm is able to cooperate with a keeper fixed to the structure;

the hooking arm is movable relative to the sliding body between a first and a second conformation, such that in the first conformation, the second axis is inclined by a non-zero first angle (β) relative to the first axis, and in the second conformation, the second axis is parallel to the first axis;

the sliding body is movable within the housing along the first axis between an unlocking position and a locking position;

in the unlocking position of the sliding body, the hooking arm is in the first conformation, said hooking arm being in a first axial position relative to the bracket;

in the locking position of the sliding body, the hooking arm is in the second conformation, said hooking arm being in a second axial position relative to the bracket, closer to the second end of the housing than in the first position;

in an intermediate position, between the locking and unlocking positions, the hooking arm is in the second conformation and in the first axial position relative to the bracket;

the sliding body has a through-hole, and the bracket comprises a rod located within the through-hole and configured to slide in the through-hole along the first axis when the latch is moved between the locking position and the unlocking position.

* * * * *